US009720720B2

(12) United States Patent
Kaplan et al.

(10) Patent No.: US 9,720,720 B2
(45) Date of Patent: Aug. 1, 2017

(54) DYNAMIC MANAGEMENT OF ASSIGNMENT AND NUMBER OF VIRTUAL FUNCTIONS ON SR-IOV CAPABLE HYPERVISORS

(71) Applicant: Red Hat Israel, Ltd., Raanana (IL)

(72) Inventors: Alona Kaplan, Raanana (IL); Michael Kolesnik, Ramat Gan (IL)

(73) Assignee: Red Hat Israel, Ltd., Raanana (IL)

( * ) Notice: Subject to any disclaimer, the term of this patent is extended or adjusted under 35 U.S.C. 154(b) by 16 days.

(21) Appl. No.: 14/631,576

(22) Filed: Feb. 25, 2015

(65) Prior Publication Data

US 2016/0246635 A1    Aug. 25, 2016

(51) Int. Cl.
  *G06F 9/50*    (2006.01)
  *G06F 9/455*   (2006.01)

(52) U.S. Cl.
  CPC ......... *G06F 9/45558* (2013.01); *G06F 9/50* (2013.01); *G06F 2009/4557* (2013.01); *G06F 2009/45595* (2013.01)

(58) Field of Classification Search
  CPC ............ G06F 9/45558; G06F 9/50; G06F 2009/4557; G06F 2009/45595
  See application file for complete search history.

(56) References Cited

U.S. PATENT DOCUMENTS

| 8,533,713 | B2 | 9/2013 | Dong | |
|---|---|---|---|---|
| 8,645,605 | B2 | 2/2014 | Subramaniyan et al. | |
| 8,862,739 | B2 * | 10/2014 | Brownlow | G06F 9/5077 709/226 |
| 2008/0147898 | A1 * | 6/2008 | Freimuth | G06F 13/4027 710/8 |
| 2009/0144731 | A1 * | 6/2009 | Brown | G06F 13/102 718/1 |
| 2009/0276773 | A1 * | 11/2009 | Brown | G06F 9/45558 718/1 |
| 2009/0276775 | A1 * | 11/2009 | Brown | G06F 9/5077 718/100 |
| 2011/0173303 | A1 * | 7/2011 | Rider | G06F 9/44505 709/220 |
| 2012/0054393 | A1 | 3/2012 | Yoshimura | |
| 2012/0059930 | A1 * | 3/2012 | Devarakonda | H04L 43/0817 709/224 |
| 2012/0131232 | A1 * | 5/2012 | Brownlow | G06F 13/4221 710/10 |
| 2012/0284712 | A1 | 11/2012 | Nimmagadda et al. | |

(Continued)

OTHER PUBLICATIONS

No Author, "SR-IOV-Passthrough-For-Networking—OpenStack," Wiki Openstack, [retrieved Dec. 23, 2014], 5 pages, Internet: <https://wiki.openstack.org/wiki/SR-IOV-passthrough-For-Networking>.

(Continued)

*Primary Examiner* — Benjamin Wu
(74) *Attorney, Agent, or Firm* — Lowenstein Sandler LLP (57) ABSTRACT

A virtualization manager receives a request to change a current number of virtual functions associated with at least one physical interface that provides virtual function capability to a new number of virtual functions. Responsive to determining that that new number of virtual functions is not greater than a maximum number of virtual functions for the at least one physical interface, configuring, by the virtualization manager, the at least one physical interface with the new number.

15 Claims, 6 Drawing Sheets

(56) References Cited

U.S. PATENT DOCUMENTS

| | | | | |
|---|---|---|---|---|
| 2012/0297379 A1* | 11/2012 | Anderson | ............ | G06F 9/45558 |
| | | | | 718/1 |
| 2013/0086583 A1 | 4/2013 | Uemura et al. | | |
| 2013/0254767 A1 | 9/2013 | Mizuno et al. | | |
| 2014/0059265 A1* | 2/2014 | Iyer | ..................... | G06F 9/5011 |
| | | | | 710/313 |
| 2014/0108776 A1* | 4/2014 | Miyauchi | ............ | G06F 9/45558 |
| | | | | 713/2 |

OTHER PUBLICATIONS

No Author, "Assign a Virtual Function as SR-IOV Passthrough Adapter to a Virtual Machine by Using the vSphere Web Client," vSphere 5.5 Documentation Center, [retrieved Dec. 23, 2014], 2 pages, Internet: https://pubs.vmware.com/vsphere-55/index.jsp?topic=%2Fcom.vmware.vsphere.networking.doc%2FGUID-898A3D66-9415-4854-8413-B40F2CB6FF8D.html>.

Polednik, "Re: [ovirt-devel] SR-IOV feature," Devel Mail Archive, Internet: <https://www.mail-archive.com/devel@ovirt.org/msg02222.html>, Nov. 4, 2014, [retrieved Jan. 11, 2016], 4 pages.

* cited by examiner

DYNAMIC MANAGEMENT OF ASSIGNMENT AND NUMBER OF VIRTUAL FUNCTIONS ON SR-IOV CAPABLE HYPERVISORS

TECHNICAL FIELD

The present disclosure is generally related to computer systems, and more particularly, to virtual device management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

A VM may comprise one or more "virtual devices," each of which may map to a physical device of the host machine (e.g., a network interface device, an I/O device such as a CD-ROM drive, a disk array, etc.). Single Root I/O Virtualization (SR-IOV) enables a single physical I/O device (e.g., a single Ethernet port) to appear as multiple, separate physical devices. A virtualization management system, or "virtualization manager," can manage the allocation of resources from host machines to VMs, monitor the status of the VMs, as well as the progress of commands and processes being executed by the VMs, and generally manage operations in the system.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for dynamic management of SR-IOV virtual functions on SR-IOV capable hypervisors. SR-IOV is a virtualization networking specification that uses physical functions (PFs) and virtual functions (VFs). Physical functions are full-featured PCIe (peripheral component interconnect express) devices that include configuration resources and capabilities for the device. Virtual functions are "lightweight" PCIe functions that contain the resources necessary for data movement, but have a carefully minimized set of configuration resources. A virtual machine's virtual device (e.g., a vNIC) can be connected directly to a virtual function instead of a virtual network bridge, bypassing virtual networking on the host to reduce latency between the VM and the physical device and lower CPU utilization devoted to packet transfer.

Providing connectivity to a virtual machine using SR-IOV capable devices can provide substantial performance gains. However, it can complicate management of virtualized environments, especially with respect to the management of the number of virtual functions assigned to each physical device. The configuration of a physical device is often managed by the associated hypervisor, with the particular configuration parameters stored in files not easily located. Thus, modifying the number of virtual functions for a particular physical function commonly requires direct access to the associated host (either physically or remotely via secure shell (SSH)). Additionally, without knowledge of particular device drivers, a user may not easily determine either the current number of virtual functions assigned to a device or the maximum number supported by the device. Moreover, changes to the number of virtual functions are not commonly persistent across hypervisor restarts, requiring configuration changes of this type to be made each time a hypervisor is restarted.

Aspects of the present disclosure address the above noted deficiencies by providing centralized dynamic management of virtual functions on SR-IOV capable hypervisors. It should be noted that although, for simplicity, aspects of the present disclosure have been described below with respect to the SR-IOV specification, in some implementations they may be applied to any specification or protocol that can provide similar virtual function capability for physical interfaces. A virtualization manager can provide centralized management of virtual functions for physical functions in a system without requiring direct access to the associated hypervisors. The virtualization manager can maintain information about each physical function (e.g., the current number of virtual functions assigned, the maximum number of virtual functions allowed, etc.) and can ensure that configuration changes remain persistent across hypervisor restarts.

In an illustrative example, a virtualization manager can receive a list of hypervisors available to the virtualization manager. In some implementations, the virtualization manager may maintain the list as hypervisors are added to the environment under management. For example, the virtualization manager may store a list in memory, in a configuration file, in a data store accessible to the host on which the virtualization manager executes, or in any similar manner. The virtualization manager may then identify at least one hypervisor supporting virtual function capability (e.g., a SR-IOV capable hypervisor) from the list of hypervisors.

The virtualization manager may identify a hypervisor supporting virtual function capability in response to a request from a user (e.g., an administrator) via a user interface for the virtualization manager (e.g., a graphical user interface, command line interface, etc.) to modify the number of virtual functions for a physical device.

Once a hypervisor is identified, the virtualization manager may select a physical interface supporting virtual function capability (e.g., an SR-IOV capable physical interface such as a physical network interface controller (NIC)) available to the identified hypervisor. In some implementations, the virtualization manager may send a request to an agent executing on the selected hypervisor for a list of physical interfaces supporting virtual function capability available. Alternatively, the virtualization manager may maintain the list of physical interfaces supporting virtual function capability available to the identified hypervisor as the physical interfaces are added to the identified hypervisor. For example, the virtualization manager may store the list in memory, in a configuration file, in a data store accessible to the host on which the virtualization manager executes, or in any similar manner. The virtualization manager may select the physical interface supporting virtual function capability in response to a request from the user to modify the number of virtual functions for a physical device via a user interface for the virtualization manager. For example, once the hypervisor has been selected, the user interface may then present physical interfaces (e.g., each physical interface) supporting virtual function capability associated with the identified hypervisor to the user for selection and configuration.

Once at least one of the identified physical interfaces supporting virtual function capability has been selected, the virtualization manager may then identify configurable parameters of the selected physical interface that may be presented to the user (e.g., via the user interface) for modification. In certain implementations, the configurable parameters may be the number of virtual functions available to be assigned, the number of virtual functions currently assigned to virtual machines, the maximum number of virtual functions that are supported by the physical interfaces, the logical network associated with the physical interfaces, or the like. In an illustrative example, the virtualization manager may determine the current number of SR-IOV virtual functions associated with the identified physical interface supporting virtual function capability. The current number of SR-IOV virtual functions may be stored on the identified hypervisor in a configuration file, a data store accessible to the identified hypervisor, in hypervisor memory, or in any similar manner. Alternatively, the virtualization manager may send a request to the identified hypervisor for the current number of SR-IOV virtual functions.

The virtualization manager may also determine the maximum number of SR-IOV virtual functions associated with the at least one physical interface supporting virtual function capability. The maximum number of SR-IOV virtual functions may be stored on the identified hypervisor in a configuration file, a data store accessible to the identified hypervisor, in hypervisor memory, or in any similar manner. Alternatively, the virtualization manager may send a request to the identified hypervisor for the maximum number of SR-IOV virtual functions.

The virtualization manager may then receive a request to change the current number of SR-IOV virtual functions associated with the at least one physical interface supporting virtual function capability to a new number of SR-IOV virtual functions. The request may be received from the user via a user interface for the virtualization manager. For example, the user may submit a request to increase the number of virtual functions associated with the physical interface. Alternatively, the user may submit the request to decrease the number. The user may enter the new number into a field on the user interface and submit the request by using an input device (e.g., hitting the enter key on a keyboard, clicking a button on a window of a graphical user interface, etc.).

The virtualization manager may compare the new number of virtual functions received in the request to the maximum number of virtual functions supported by the networking device. If the virtualization manager determines that the new number received in the request is greater than the maximum number supported, then the virtualization manager may reject the request to change the current number of virtual functions. The virtualization manager may send a notification to the requestor to indicate that the request has been rejected and the reason for the rejection. For example, if the request was entered by a user via a user interface, the virtualization manager may present an error screen or dialog box to alert the user that the request has been rejected because the user requested a number of virtual functions that is too large for the networking device to support.

The virtualization manager may also determine whether any of the available virtual functions for the networking device have already been assigned to a virtual machine or attached to another device (e.g., a virtual bridge). A virtual function can be connected to a virtual bridge, which is in turn connected to a virtual machine. If any of the virtual functions have been assigned to a virtual machine or another device, the virtualization manager may reject the request. The virtualization manager may send a notification to the requestor to indicate that the request has been rejected and the reason for the rejection. For example, if the request was entered by a user into a user interface, the virtualization manager may present an error screen or dialog box to alert the user that the request has been rejected because the user requested a change to the number of virtual functions, but changes are not permitted when at least one virtual function has already been assigned to a virtual machine or attached to another device.

If the virtualization manager determines that none of the current virtual functions have been assigned to a virtual machine and the new number received in the modification request is not greater than the maximum number supported by the physical interface, the virtualization manager may then configure the physical interface supporting virtual function capability with the new number. In some implementations, the virtualization manager may first determine the location of the data source that stores the number of virtual functions associated with the physical interface. The location of the data source may be stored locally by the virtualization manager. Alternatively, the virtualization manager may send a request to the identified hypervisor for the location of the data source.

The virtualization manager may then identify the data source at the determined location. The data source may be a configuration file, a memory space, a record on a database, or the like. The data source may store the number of virtual functions associated with the physical interface. In some implementations, the data source may store additional configuration information related to the virtual functions of the physical interface (e.g., a process identifier of the assigned virtual machine). Once identified, the virtualization manager may modify the data source with the new number. In some implementations, all current virtual functions may be deleted and an entirely new set of virtual functions created any time the number of virtual functions is modified. In this case, the virtualization manager may first write a '0' to the data source that can cause the current virtual functions to be deleted, then subsequently write the new number to the data source that can cause the new set of virtual functions to be created.

Once the data source has been modified, the virtualization manager may send a notification to the hypervisor supporting virtual function capability that the current number of virtual functions has been changed to the new number. The hypervisor supporting virtual function capability can then delete each of the current SR-IOV virtual functions associated with the physical interface. In some implementations, this can be triggered by the virtualization manager writing a '0' to the configuration data source as noted above. The hypervisor supporting virtual function capability may then create a new set of SR-IOV virtual functions to be associated with the physical interface supporting virtual function capability, where the amount of new SR-IOV virtual functions is equal to the new number from the modification request. SR-IOV virtual functions are presented as regular PCI devices, so deleting the virtual function can remove it from the device list for the host. Additionally, the data queues, registers, and other applicable data structures associated with the virtual function are removed, and the MAC address for the virtual function is released. When an SR-IOV virtual function is recreated, a new name, MAC address, data queue, register set, etc. are created for the new virtual function. The hypervisor supporting virtual function capability can then associate the new SR-IOV virtual functions with the physical interface supporting virtual function capability.

The virtualization management system can ensure that the new number of virtual functions remains persistent across restarts of the hypervisor supporting virtual function capability. To do so, the virtualization manager can send a notification to the hypervisor supporting virtual function capability with the number of virtual functions associated with the physical interface if the hypervisor supporting virtual function capability restarts. In some implementations, the virtualization manager may notify the hypervisor supporting virtual function capability by sending the notification to a software agent executing on the hypervisor via an application programming interface (API). The receiving agent may then make the appropriate changes to the hypervisor configuration at the time of restart.

Aspects of the present disclosure are thus capable of providing centralized dynamic management of virtual functions on hypervisors supporting virtual function capability. More particularly, aspects of the present disclosure can provide the ability for a virtualization manager to modify the number of virtual functions associated with a physical interface that remains persistent across hypervisor restarts.

Figure 1:
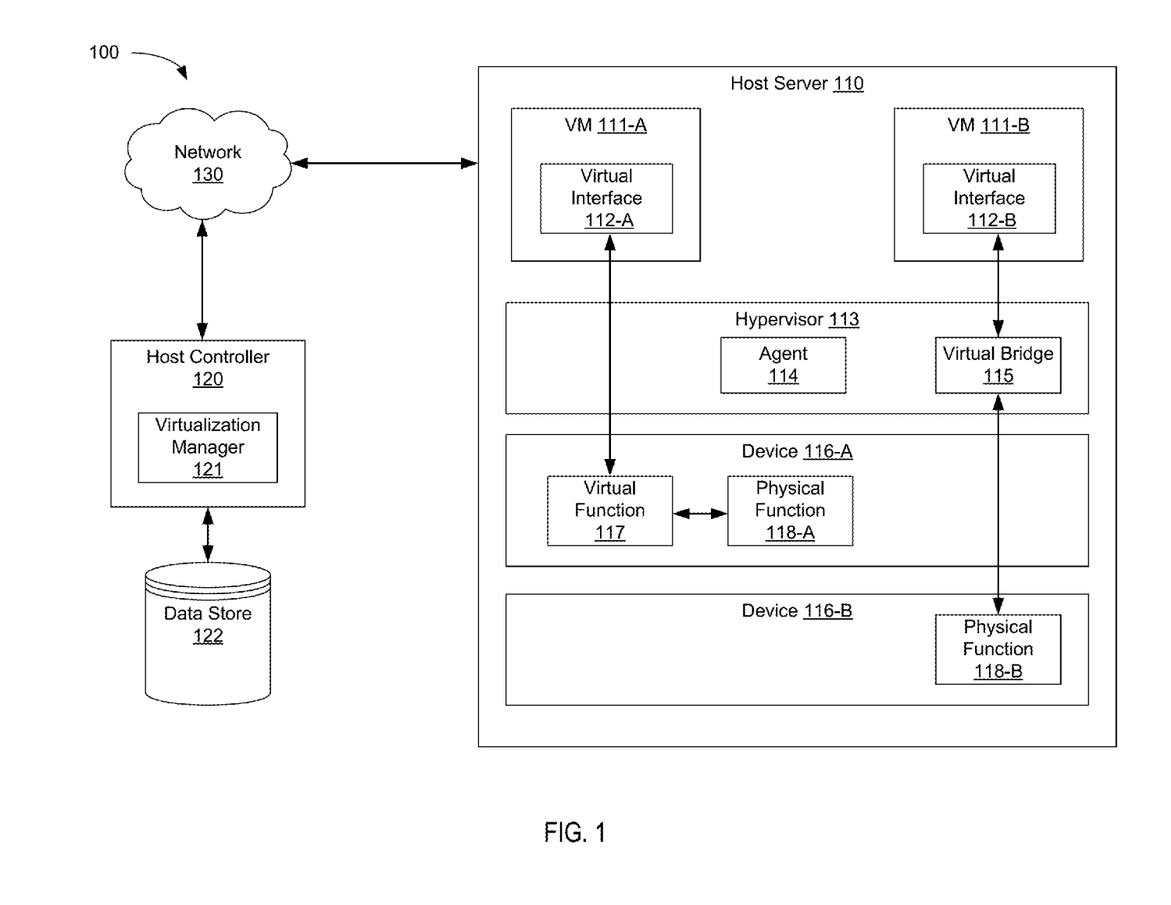
FIG. 1 depicts a high-level component diagram of an example computer system architecture, in accordance with one or more aspects of the present disclosure.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 includes one or more host servers 110 coupled to a host controller 120 over a network 130. The network 130 may be a private network (e.g., a local area network (LAN), wide area network (WAN), intranet, etc.) or a public network (e.g., the Internet). Host controller 120 may be an independent machine such as a server computer, a desktop computer, etc. Alternatively, the host controller 120 may be part of the host server 110.

Host server 110 may comprise server computers or any other computing devices capable of running one or more virtual machines (VM) 111. Each VM 111 runs a guest operating system (OS) (not pictured) that may be different from one virtual machine to another. The guest OS may include Microsoft Windows, Linux, Solaris, Mac OS, etc. The host server 110 may also comprise a hypervisor 113 that emulates the underlying hardware platform for VM 111. The hypervisor 113 may also be known as a virtual machine monitor (VMM) or a kernel-based hypervisor. The host server 110 may also comprise one or more devices 116 available on host server 110 (e.g., a network interface device, an I/O device such as a CD-ROM driver, a disk array, etc.) that may or may not support virtual function capability.

The hypervisor 113 may comprise agent 114 that monitors VMs (e.g., VM 111) that may run on host server 110. Agent 114 can monitor VM runtime status, hardware configuration, network and storage connectivity on the host server 110, and similar VM-related and host-related statistical information. Agent 114 may store this information as it is collected for later use by the virtualization manager 121. For example, Agent 114 may save this information in a local memory space. Alternatively, agent 114 may save the information to a data store accessible by the host server 110. Agent 114 can send and receive information regarding VM 111 via an API that allows agent 114 to communicate with other components of network architecture 100. Agent 114 may additionally provide information upon request from virtualization manager 121 relating to the devices (e.g., devices 116) that support virtual function capability as described in detail below with respect to FIGS. 3 and 4. Hypervisor 113 may additionally comprise virtual bridge 115 that can be used to connect a virtual interface of one or more of VMs 111 to a physical device that may not support virtual function capability.

Devices 116 may or may not support virtual function capabilities for use with virtual interfaces 112 of VMs 111. In FIG. 1, device 116-A depicts a device supporting virtual function capability (e.g., SR-IOV capable). Device 116-A comprises virtual function 117 and physical function 118-A. Virtual function 117 can comprise resources necessary for data movement, but have a minimized set of configuration resources (e.g., SR-IOV PCIe virtual functions). It should be noted that although for simplicity only one virtual function 117 is depicted, in other implementations, multiple virtual functions 117 may be present. Physical function 118-A can comprise full-featured PCIe devices that include all configuration resources and capabilities for device 116-A. Virtual function 117 may be assigned to virtual interface 112-A in order to provide VM 111-A access to physical function 118-A. Device 116-B depicts a device that does not support virtual function capability, comprising physical function 118-B, which may not be connected to any virtual functions. It should be noted that although for simplicity device 116-A and 116-B each depict different virtual function capability, in other implementations, devices 116 may support both virtual function capability as well as connectivity via a virtual bridge.

Each VM 111 may comprise a virtual interface that provides connectivity to one of the devices 116 of host server 110. VM 111-A depicts a virtual interface 112-A that is connected to physical function 118-A of device 116-A via a virtual function 117. VM 111-B depicts a virtual interface 112-B that is connected to physical function 118-B of device 116-B via virtual bridge 115.

Each VM 111 may be linked to one or more virtual disks (not shown). These virtual disks can be logical partitions of a physical disk managed by hypervisor 113, can be cloud based storage devices, or can be some other type of virtual storage device. In one embodiment, virtual disks may form a whole or part of a logical data center. In one embodiment, VM 111 and virtual disks, together with host server 110, may be collectively referred to as entities in a virtual machine system.

The VM 111 and virtual disks can be managed by a host controller 120 (e.g., after the host 110 has been associated with the host controller 120). Host controller 120 may manage the allocation of resources from host server 110 to VM 111. In addition, host controller may monitor the status of VM 111 as well as the progress of commands and processes being executed by VM 111 and/or on VM 111. In some implementations, host controller 120 may run on a separate physical machine from the host server 110. Alternatively, host controller 120 may run on the host server 110 itself. The host controller 120 may include a virtualization manager 121 to determine availability of virtual function 117 and configure the number of virtual functions 117 associated with physical function 118-A of device 116-A as described in detail below with respect to FIGS. 3-4. The host controller 120 may also maintain a data store 122 to store information pertaining to the various devices 116 in the virtualization system (e.g., virtual interfaces, virtual disks, etc.). The data store 122 may share the machine with the host controller 120 (e.g., a disk drive in the host controller computer) or be an independent device coupled to the host controller directly or via a network (e.g., as a network-attached storage device (NAS)).

Figure 2:
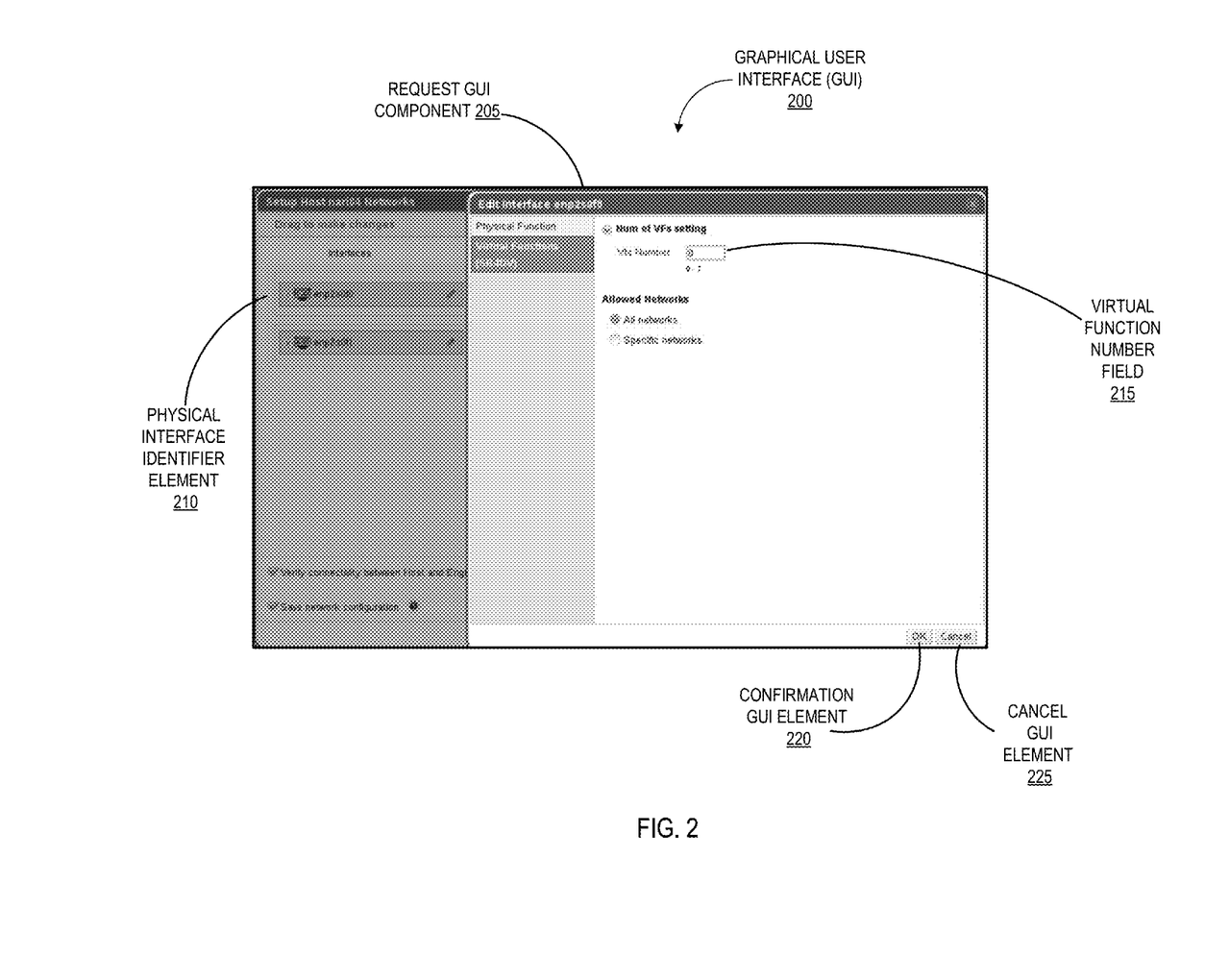
FIG. 2 illustrates an example of a graphical user interface (GUI) for configuring the number of virtual functions associated with a physical interface, in accordance with one or more aspects of the present disclosure.

FIG. 2 illustrates an example of a graphical user interface (GUI) 200 for configuring the number of virtual functions associated with a physical interface. GUI 200 may be presented by a stand-alone application, a component of a user interface for a virtualization manager, or in any other manner. For example, GUI 200 may be presented to a user by virtualization manager 121 of FIG. 1 as described in detail below with respect to FIGS. 3-4.

GUI 200 may present request GUI component 205 (e.g., a popup window) to a user in order to submit a request to a virtualization manager to configure the number of virtual functions associated with a physical interface. Physical interface identifier element 210 may present a list of physical interfaces supporting virtual function capability associated with a hypervisor selected by a user. Alternatively, in other implementations, the user may enter identification information in physical interface identifier element 210 that can specify the physical interface that the user wishes to configure. Physical interface identifier element 210 may be a unique identifier (e.g., a virtual logical area network (VLAN) tag, network alias, or the like) that identifies a particular physical interface to the virtualization manager.

Virtual function number field 215 can be an input field that allows the user to specify the number virtual functions to associate with the selected physical interface. As shown in FIG. 2, virtual function number field 215 may be displayed as a graphical user interface text entry box, but in other implementations may be a dropdown list, radio button, or the like. Also as shown in FIG. 2, virtual function number field 215 presents the maximum number of virtual functions supported by the selected physical interface.

Once the user clicks the confirmation GUI element 220 on request GUI component 205, the virtualization manager can configure the physical interface as described in detail below with respect to FIGS. 3-4. If the user selects a number of virtual functions that is greater than the maximum number supported by the physical interface, the virtualization manager may display a dialog box or alert window (not shown) in GUI 200 to alert the user. The user may then elect an alternative number of virtual functions (e.g., by entering a new number in the virtual function number field 215). Alternatively, the user may cancel the configuration request by clicking the cancel GUI element 225. In FIG. 2, confirmation GUI element 220 and cancel GUI element 225 are represented as buttons on a graphical user interface, but in other implementations can be links, dropdown lists, checkboxes, or any other GUI elements that provide similar functionality.

Figure 3:
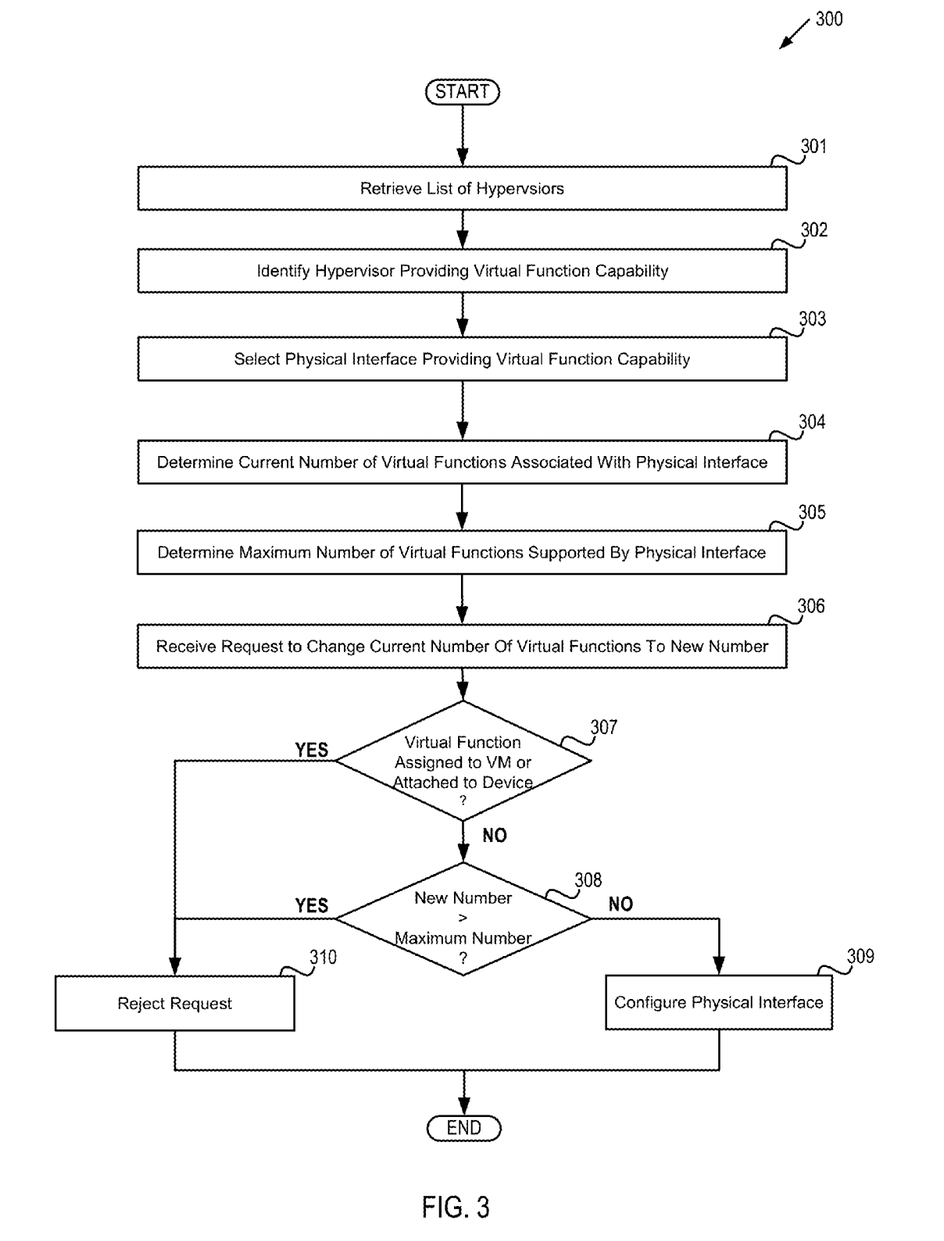
FIG. 3 depicts a flow diagram of a method for dynamic management of SR-IOV virtual functions on SR-IOV capable hypervisors, in accordance with one or more aspects of the present disclosure.

FIG. 3 depicts a flow diagram of an example method 300 for dynamic management of SR-IOV virtual functions on SR-IOV capable hypervisors. The method may be performed by processing logic that may comprise hardware (circuitry, dedicated logic, etc.), software (such as is run on a general purpose computer system or a dedicated machine), or a combination of both. In one illustrative example, method 300 may be performed by virtualization manager 121 of host controller 120 in FIG. 1. Alternatively, some or all of method 300 might be performed by another module or machine. It should be noted that blocks depicted in FIG. 3 could be performed simultaneously or in a different order than that depicted.

At block 301, processing logic retrieves a list of hypervisors available to a virtualization manager. In some implementations, the virtualization manager may maintain the list as hypervisors are added to the environment under management. For example, the virtualization manager may store a list in memory, in a configuration file, in a data store accessible to the host on which the virtualization manager executes, or in any similar manner.

At block 302, processing logic identifies at least one hypervisor providing virtual function capability from the list of hypervisors. Processing logic may identify a hypervisor supporting virtual function capability in response to a request from a user (e.g., an administrator) via a user interface for the virtualization manager (e.g., a graphical user interface, command line interface, etc.) to modify the number of virtual functions for a physical device.

At block 303, processing logic selects at least one physical interface that provides virtual function capability (e.g., an SR-IOV capable physical interface such as a physical network interface controller (NIC)) for the hypervisor identified at block 302. In some implementations, processing logic may send a request to an agent executing on the identified hypervisor for a list physical interfaces supporting virtual function capability available. Alternatively, the virtualization manager may maintain the list of physical interfaces supporting virtual function capability available to the selected hypervisor as the physical interfaces are added to the identified hypervisor. Processing logic may select the physical interface supporting virtual function capability in response to a request from a user to modify the number of virtual functions for a physical device via a user interface for the virtualization manager. For example, once the hypervisor has been selected, the user interface may then present all physical interfaces supporting virtual function capability associated with the identified hypervisor to the user for selection and configuration.

At block 304, processing logic determines the current number of virtual functions associated with the physical interface selected at block 303. The current number of SR-IOV virtual functions may be stored on the identified hypervisor in a configuration file, a data store accessible to the identified hypervisor, in hypervisor memory, or in any similar manner. Alternatively, the virtualization manager may send a request to the identified hypervisor for the current number of SR-IOV virtual functions.

At block 305, processing logic determines the maximum number of virtual functions supported by the physical interface selected at block 303. The maximum number of SR-IOV virtual functions may be stored on the identified hypervisor in a configuration file, a data store accessible to the identified hypervisor, in hypervisor memory, or in any similar manner. Alternatively, the virtualization manager may send a request to the identified hypervisor for the maximum number of SR-IOV virtual functions.

At block 306, processing logic receives a request to change the current number of virtual functions associated with the physical interface selected at block 303 to a new number. The request may be received from the user via a user interface for the virtualization manager. For example, the user may submit a request to increase the number of virtual functions associated with the physical interface. Alternatively, the user may submit the request to decrease the number. The user may enter the new number into a field on the user interface and submit the request by using an input device (e.g., hitting the enter key on a keyboard, clicking a button on a window of a graphical user interface, etc.).

At block 307, processing logic determines whether any of the virtual functions associated with the physical interface selected at block 303 have already been assigned to a virtual machine or attached to another device. If so, processing proceeds to block 310 where processing logic rejects the request. Otherwise, processing continues to block 308.

At block 308, processing logic determines whether the new number of virtual functions received in the request is greater than the maximum number of virtual functions supported by the physical interface selected at block 303. If not, processing continues to block 309. Otherwise, processing proceeds to block 310 where processing logic rejects the request.

At block 309, processing logic configures the physical interface with the new number of virtual functions. In some implementations, processing logic configures the physical interface as described below in further detail with respect to the method of FIG. 4.

At block 310, processing logic rejects the request to change the current number of virtual functions. Processing logic may send a notification to the requestor to indicate that the request has been rejected and the reason for the rejection. For example, if the request was entered by a user into a user interface, the virtualization manager may present an error screen or dialog box to alert the user that the request has been rejected along with the reason for the rejection. After block 310, the method of FIG. 3 terminates.

Figure 4:
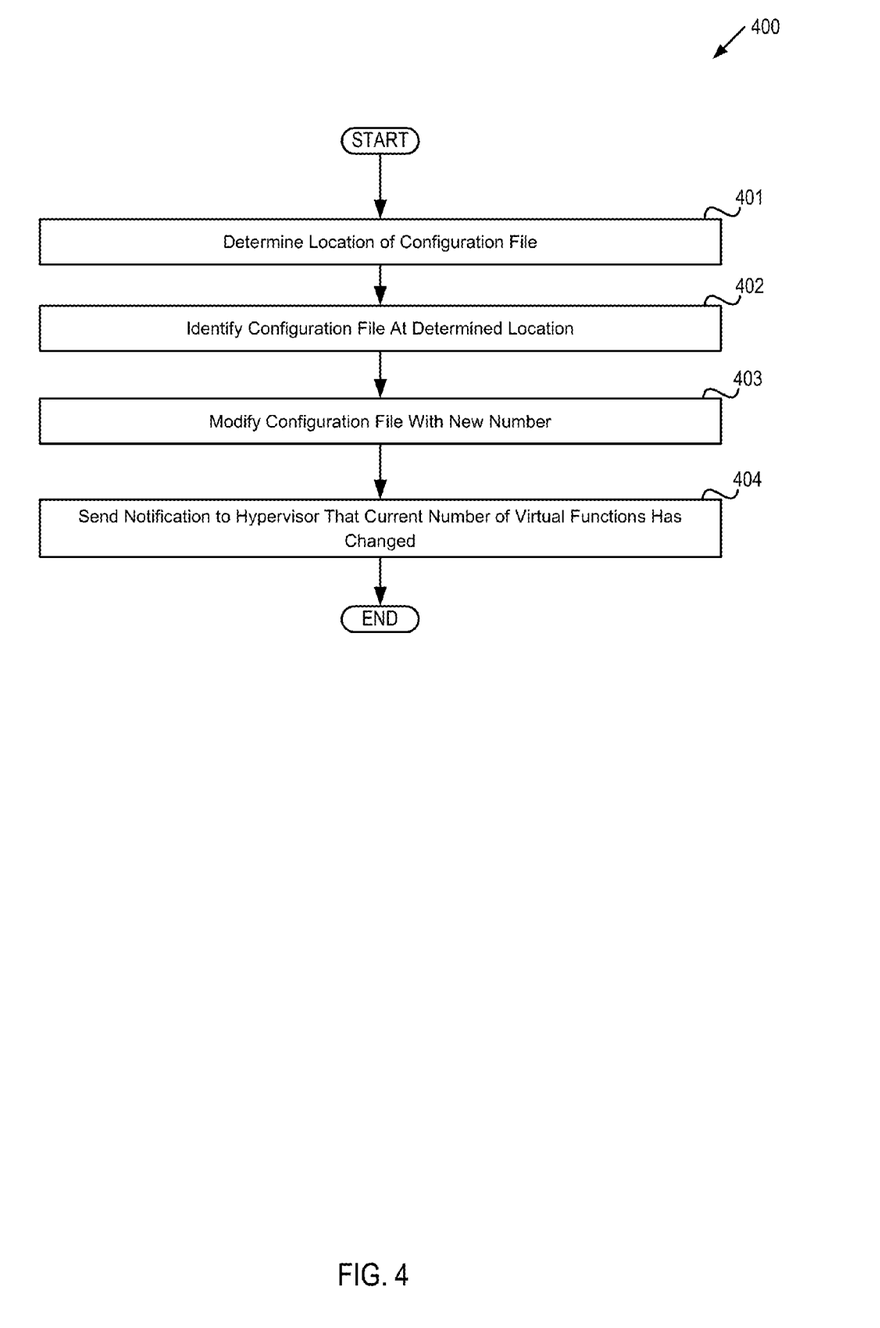
FIG. 4 depicts a flow diagram of a method for configuring the number of virtual functions on an SR-IOV capable hypervisor, in accordance with one or more aspects of the present disclosure.

FIG. 4 depicts a flow diagram of an example method 400 for configuring the number of virtual functions on an SR-IOV capable hypervisor. The method may be performed by processing logic that may comprise hardware (circuitry, dedicated logic, etc.), software (such as is run on a general purpose computer system or a dedicated machine), or a combination of both. In one illustrative example, method 400 may be performed by virtualization manager 121 of host controller 120 in FIG. 1. Alternatively, some or all of method 400 might be performed by another module or machine. It should be noted that blocks depicted in FIG. 4 could be performed simultaneously or in a different order than that depicted.

At block 401, processing logic determines the location of a data source that stores the number of virtual functions associated with a physical interface selected for configuration. The location of the data source may be stored locally by the virtualization manager. Alternatively, the virtualization manager may send a request to the identified hypervisor for the location of the data source.

At block 402, processing logic identifies the data source at the location determined at block 401. The data source may be a configuration file, a memory space, a record on a database, or the like. The data source may store the number of virtual functions associated with the physical interface. In some implementations, the data source may store additional configuration information related to the virtual functions of the physical interface (e.g., a process identifier of the assigned virtual machine).

At block 403, processing logic modifies the data source with the new number of virtual functions for the physical interface. In some implementations, all current virtual functions may be deleted and an entirely new set of virtual functions created any time the number of virtual functions is modified. In this case, processing logic may first write a '0' to the data source that can cause the current virtual functions to be deleted by the associated hypervisor, then subsequently write the new number to the data source that can cause the new set of virtual functions to be created by the associated hypervisor. At block 404, processing logic sends a notification to the associated hypervisor that the current number of virtual functions has been changed. After block 404, the method of FIG. 4 terminates.

Figure 5:
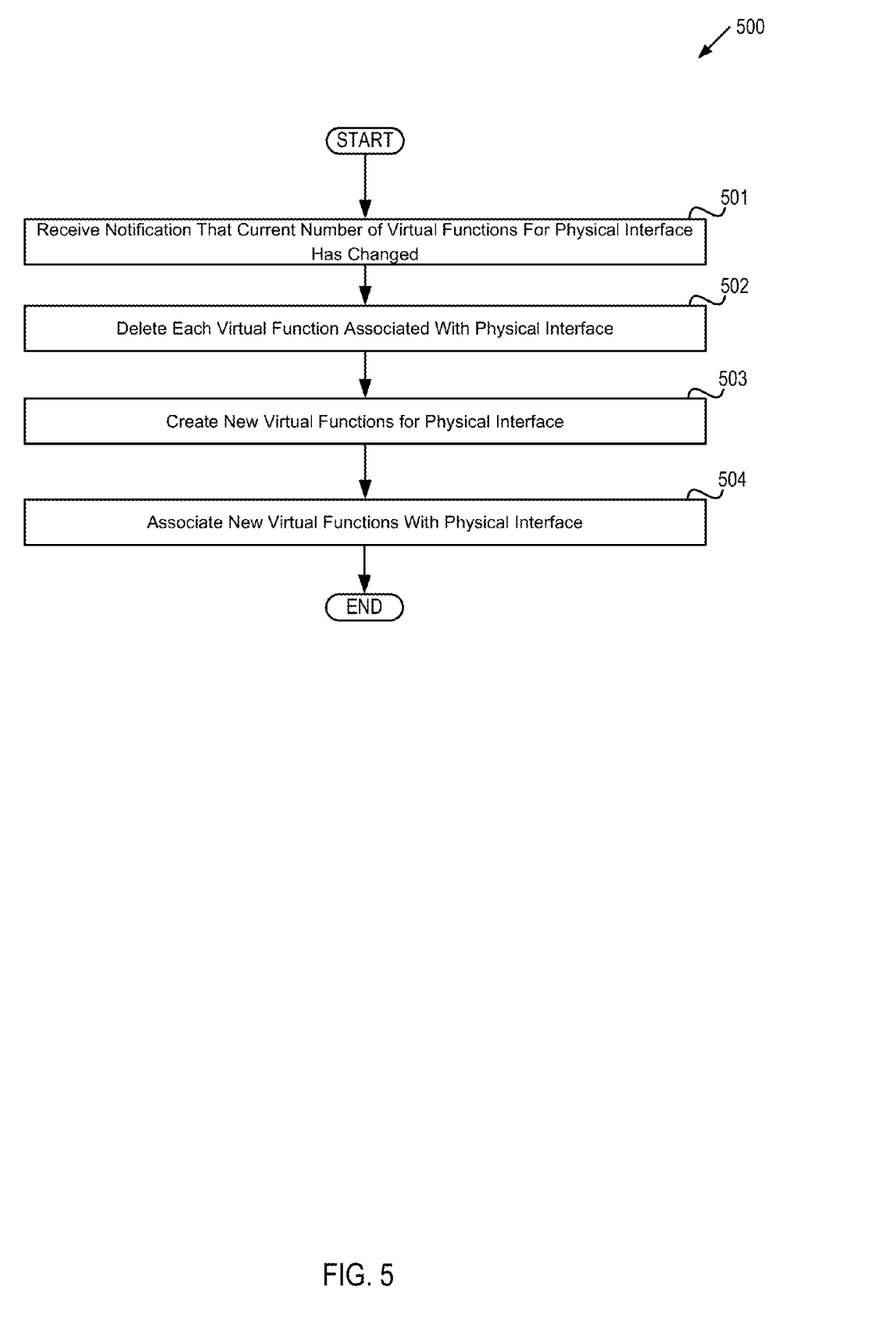
FIG. 5 depicts a flow diagram of a method for modifying the number of virtual functions associated with a physical interface by an SR-IOV capable hypervisor, in accordance with one or more aspects of the present disclosure.

FIG. 5 depicts a flow diagram of an example method 500 for modifying the number of virtual functions associated with a physical interface by an SR-IOV capable hypervisor. The method may be performed by processing logic that may comprise hardware (circuitry, dedicated logic, etc.), software (such as is run on a general purpose computer system or a dedicated machine), or a combination of both. In one illustrative example, method 500 may be performed by virtualization manager 121 of host controller 120 in FIG. 1. Alternatively, some or all of method 500 might be performed by another module or machine. It should be noted that blocks depicted in FIG. 5 could be performed simultaneously or in a different order than that depicted.

At block 501, processing logic receives a notification that the current number of virtual functions for a physical interface has been changed. At block 502, processing logic deletes each virtual function associated with the physical interface. At block 503, processing logic creates new virtual functions for the physical interface. At block 504, processing logic associates the new virtual functions with the physical interface. After block 504, the method of FIG. 5 terminates.

Figure 6:
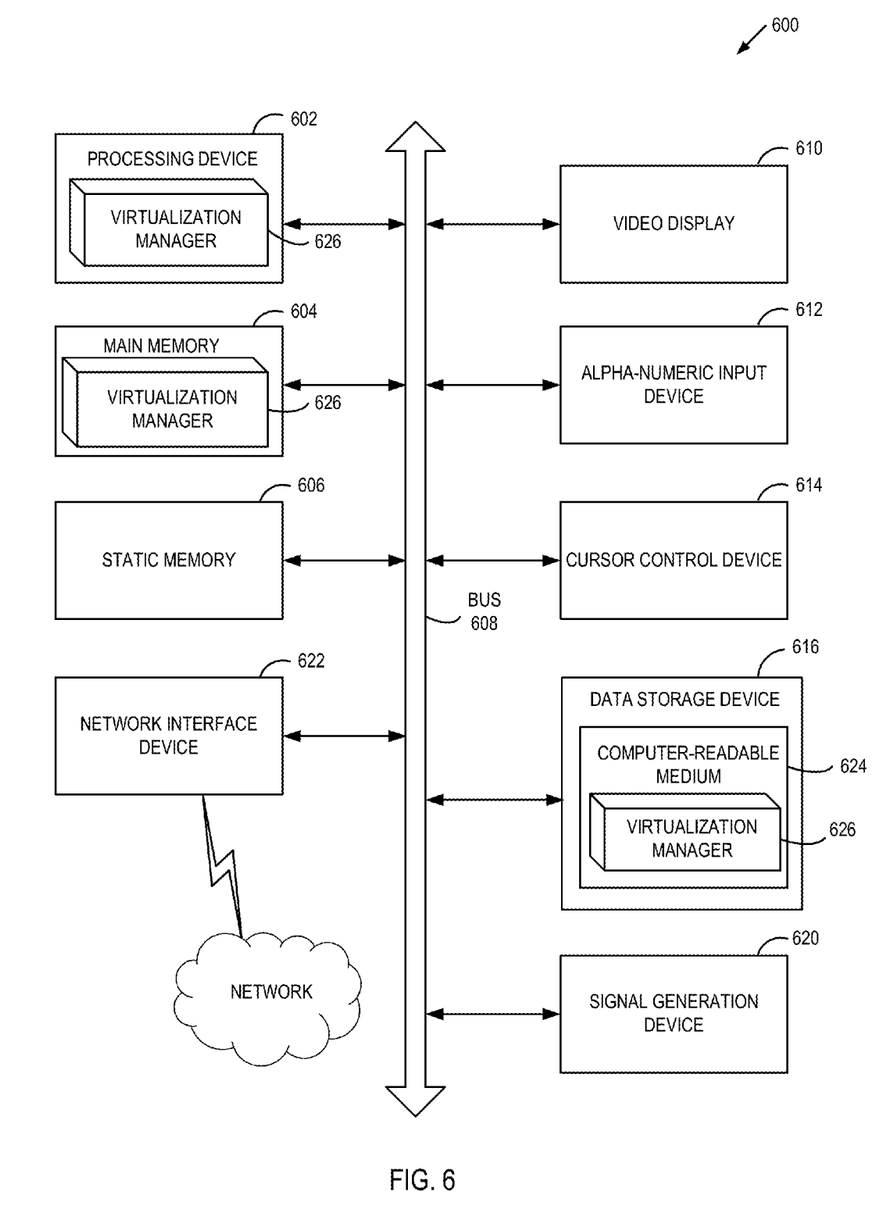
FIG. 6 depicts a block diagram of an illustrative computer system operating in accordance with examples of the invention.

FIG. 6 depicts an example computer system 600 which can perform any one or more of the methods described herein. In one example, computer system 600 may correspond to network architecture 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary network architecture 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute virtualization manager 626 for performing the operations and steps discussed herein (e.g., corresponding to the methods of FIGS. 3-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable medium 624 on which is stored virtualization manager 626 (e.g., corresponding to the methods of FIGS. 3-5, etc.) embodying any one or more of the methodologies or functions described herein. Virtualization manager 626 may also reside, completely or at least partially, within the main memory 604 and/or within the processing device 602 during execution thereof by the computer system 600, the main memory 604 and the processing device 602 also constituting computer-readable media. Virtualization manager 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "retrieving," "identifying," "selecting," "receiving," "configuring," "determining," "modifying," "rejecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   retrieving, by a processing device executing a virtualization manager, a list of hypervisors available to the virtualization manager, wherein the list of hypervisors comprises a virtual function capability of each hypervisor on the list of hypervisors;
   identifying, by the virtualization manager, a hypervisor providing the virtual function capability from the list of hypervisors;
   selecting, by the virtualization manager, at least one physical interface that provides the virtual function capability for the identified hypervisor;
   determining a current number of virtual functions associated with the at least one physical interface;
   determining a maximum number of virtual functions associated with the at least one physical interface;
   receiving, by the virtualization manager, a request to change the current number of virtual functions associated with the at least one physical interface to a modified number of virtual functions;
   responsive to determining that the modified number of virtual functions is not greater than the maximum number of virtual functions for the at least one physical interface, configuring, by the virtualization manager, the at least one physical interface with the modified number; and
   responsive to determining that at least one virtual function associated with the at least one physical interface has been assigned to a virtual machine or attached to another device, rejecting the request to change the current number of virtual functions.

2. The method of claim 1, wherein configuring the at least one physical interface with the modified number comprises:
   determining a location of a data source that stores the number of virtual functions associated with the at least one physical interface;
   identifying the data source at the determined location; and
   modifying the data source with the modified number.

3. The method of claim 1, further comprising:
   responsive to determining that the modified number of virtual functions is greater than the maximum number of virtual functions for the at least one physical interface, rejecting the request to change the current number of virtual functions.

4. The method of claim 1, further comprising sending a notification to the at least one hypervisor that the current number of virtual functions has been changed to the modified number.

5. The method of claim 4, wherein the at least one hypervisor providing virtual function capability is to:
   delete each virtual function associated with the at least one physical interface;
   create new virtual functions to be associated with the at least one physical interface, wherein an amount of new virtual functions is equal to the modified number; and
   associate the new virtual functions with the at least one physical interface.

6. A computing apparatus comprising:
   a memory; and
   a processing device, operatively coupled to the memory, to:
      retrieve a list of hypervisors available to the virtualization manager, wherein the list of hypervisors comprises a virtual function capability of each hypervisor on the list of hypervisors;
      identify a hypervisor providing the virtual function capability from the list of hypervisors;
      select at least one physical interface that provides virtual function capability for the identified hypervisor;
      determine the current number of virtual functions associated with the at least one physical interface;
      determine the maximum number of virtual functions associated with the at least one physical interface;
      receive a request to change the current number of virtual functions associated with at least one physical interface that provides the virtual function capability for the identified hypervisor to a modified number of virtual functions;
      responsive to determining that the modified number of virtual functions is not greater than the maximum number of virtual functions for the at least one physical interface, configure, the at least one physical interface with the modified number; and
      responsive to determining that at least one virtual function associated with the at least one physical interface has been assigned to a virtual machine or attached to another device, reject the request to change the current number of virtual functions.

7. The apparatus of claim 6, wherein to configure the at least one physical interface with the modified number, the processing device is to:
determine a location of a data source that stores the number of virtual functions associated with the at least one physical interface;
identify the data source at the determined location; and
modify the data source with the modified number.

8. The apparatus of claim 6, wherein the processing device is further to:
responsive to determining that the modified number of virtual functions is greater than the maximum number of virtual functions for the at least one physical interface, reject the request to change the current number of virtual functions.

9. The apparatus of claim 6, wherein the processing device is further to send a notification to the at least one hypervisor that the current number of virtual functions has been changed to the modified number.

10. The apparatus of claim 9, wherein the at least one hypervisor providing virtual function capability is to:
delete each virtual function associated with the at least one physical interface;
create new virtual functions to be associated with the at least one physical interface, wherein an amount of new virtual functions is equal to the modified number; and
associate the new virtual functions with the at least one physical interface.

11. A non-transitory computer readable storage medium, having instructions stored therein, which when executed by a processing device of a computer system, cause the processing device to:
retrieve, by the processing device executing a virtualization manager, a list of hypervisors available to the virtualization manager, wherein the list of hypervisors comprises a virtual function capability of each hypervisor on the list of hypervisors;
identify by the virtualization manager, a hypervisor providing the virtual function capability from the list of hypervisors;
select by the virtualization manager, at least one physical interface that provides the virtual function capability for the identified hypervisor;
determine by the virtualization manager, a current number of virtual functions associated with the at least one physical interface;
determine by the virtualization manager, a maximum number of virtual functions associated with the at least one physical interface;
receive, by the virtualization manager, a request to change the current number of virtual functions associated with at least one physical interface that provides virtual function capability to a modified number of virtual functions;
responsive to determining that the modified number of virtual functions is not greater than the maximum number of virtual functions for the at least one physical interface, configuring, by the virtualization manager, the at least one physical interface with the modified number; and
responsive to determining that at least one virtual function associated with the at least one physical interface has been assigned to a virtual machine or attached to another device, reject the request to change the current number of virtual functions.

12. The non-transitory computer readable storage medium of claim 11, wherein to configure the at least one physical interface with the modified number, the processing device is to:
determine a location of a data source that stores the number of virtual functions associated with the at least one physical interface;
identify the data source at the determined location; and
modify the data source with the modified number.

13. The non-transitory computer readable storage medium of claim 11, wherein the processing device is further to:
responsive to determining that the modified number of virtual functions is greater than the maximum number of virtual functions for the at least one physical interface, reject the request to change the current number of virtual functions.

14. The non-transitory computer readable storage medium of claim 11, wherein the processing device is further to send a notification to the at least one hypervisor that the current number of virtual functions has been changed to the modified number.

15. The non-transitory computer readable storage medium of claim 14, wherein the at least one hypervisor providing virtual function capability is to:
delete each virtual function associated with the at least one physical interface;
create new virtual functions to be associated with the at least one physical interface, wherein an amount of new virtual functions is equal to the modified number; and
associate the new virtual functions with the at least one physical interface.

* * * * *